United States Patent
Zeller et al.

(10) Patent No.: US 7,297,898 B2
(45) Date of Patent: Nov. 20, 2007

(54) LASER PROCESSING MACHINE

(75) Inventors: Thomas Zeller, Sindelfingen (DE); Joachim Schulz, Stuttgart (DE)

(73) Assignee: Trumpf Lasertechnik GmbH, Ditzingen (DE)

( * ) Notice: Subject to any disclaimer, the term of this patent is extended or adjusted under 35 U.S.C. 154(b) by 0 days.

(21) Appl. No.: 10/520,525

(22) PCT Filed: Jun. 14, 2003

(86) PCT No.: PCT/EP03/06283

§ 371 (c)(1),
(2), (4) Date: Sep. 29, 2005

(87) PCT Pub. No.: WO2004/008216

PCT Pub. Date: Jan. 22, 2004

(65) Prior Publication Data

US 2006/0102603 A1    May 18, 2006

(30) Foreign Application Priority Data

Jun. 14, 2003    (DE)    ................... 10230960

(51) Int. Cl.
*B23K 26/06*    (2006.01)
*G02B 5/10*    (2006.01)
(52) U.S. Cl. ................. 219/121.74; 359/858; 359/859
(58) Field of Classification Search ................. 219/374, 219/121.74; 359/202, 203, 365, 366, 859, 359/863
See application file for complete search history.

(56) References Cited

U.S. PATENT DOCUMENTS

| | | | | |
|---|---|---|---|---|
| 3,674,334 A | * | 7/1972 | Offner | ................ 359/859 |
| 4,205,902 A | | 6/1980 | Shafer | ................ 359/366 |
| 4,568,982 A | * | 2/1986 | Follett | ................ 359/223 |
| 4,806,728 A | * | 2/1989 | Salzer et al. | ........... 219/121.74 |
| 5,306,892 A | | 4/1994 | Hohberg | ............ 219/121.74 |
| 5,499,067 A | * | 3/1996 | Shibazaki | ................ 359/858 |
| 5,574,601 A | * | 11/1996 | Hall | ................ 359/859 |
| 6,072,149 A | * | 6/2000 | Maruyama et al. | ..... 219/121.63 |
| 6,078,420 A | * | 6/2000 | Macken | ................ 359/365 |
| 6,789,908 B2 | * | 9/2004 | Garcia | ................ 359/859 |
| 6,934,014 B1 | * | 8/2005 | Kleinhuber | ............ 219/121.74 |

FOREIGN PATENT DOCUMENTS

| | | | |
|---|---|---|---|
| DE | 412 06 84 | 12/1992 | |
| EP | 0 649 042 | 4/1995 | |
| JP | 4-301613 A | * 10/1992 | ............. 359/859 |
| WO | WO-01/26859 A1 | * 4/2001 | |

* cited by examiner

*Primary Examiner*—Geoffrey S. Evans
(74) *Attorney, Agent, or Firm*—Fish & Richardson P.C.

(57) ABSTRACT

In a laser processing machine for processing workpieces using a laser beam (2), a telescope (1) for widening the laser beam (2) comprises an ellipsoidal mirror (3) and a paraboloidal mirror (4) whose axes of rotation (6) extend parallel, in particular collinear, to each other. This orientation permits precise production of the reflecting surfaces of the two mirrors through one single clamping (e.g. through diamond lathe) such that later adjustment is not required.

30 Claims, 5 Drawing Sheets

LASER PROCESSING MACHINE

TECHNICAL FIELD

This invention relates to optics, and more particularly to a laser processing machine.

BACKGROUND

An ellipsoid is an elliptical rotational solid that is generated through rotation of an ellipse about an axis of rotation, especially about one of the semimajor axes of the ellipse, and is characterized by two focal distances. An "ellipsoidal mirror" as used herein means a mirror whose mirror surface has an ellipsoidal segment.

A paraboloid is a parabolic rotational solid that is generated through rotation of a parabola about an axis of rotation, especially about the symmetry axis of the parabola, and is characterized by a focal distance. A "paraboloidal mirror" as used herein means a mirror whose mirror surface has a paraboloidal segment.

Laser processing machines with scanner systems, which are used, for example, for remote welding, can have movable optics in front of a deflecting mirrors (e.g., scanner mirrors), through which the focal position of the laser beam can be varied. Because the laser beam is simultaneously widened to obtain a small focal diameter, for low laser powers, movable telescopes with transmitting optics are used, and for higher powers, movable telescopic systems with an ellipsoidal mirror and a paraboloidal mirror are used, which are usually designed as metal optics.

In the two mirror telescopic system, the orientation of the two mirrors with respect to each other has proven to be problematic in the design of such a telescopic system. Five adjusting axes are required to adjust the two mirrors. In addition to the large adjustment expense, the design of the telescopic system is moreover aggravated in that, at present there are no known suitable measuring methods and instruments to permit precise adjustment of the mirrors relative to each other.

SUMMARY

A laser processing machine for processing workpieces using a laser beam can include a telescope for widening the laser beam. The telescope includes an ellipsoidal mirror and a paraboloidal mirror.

In a general aspect, a laser processing machine for processing workpieces using a laser beam includes a telescope for widening and focusing a laser beam and a mirror positioned to adjust an optical axis of a laser beam entering the telescope parallel to an optical axis of a laser beam exiting the telescope. The telescope includes an ellipsoidal mirror having a first axis of rotation and a first surface that lies on an ellipse having two foci and a paraboloidal mirror having a second axis of rotation that is parallel to the first axis of rotation and a second surface that lies on a parabola having a focus that coincides with one of the foci of the ellipse.

In another general aspect, a telescope for widening and focusing a laser beam includes an ellipsoidal mirror having a first axis of rotation and a first surface that lies on an ellipse having two foci, a paraboloidal mirror having a second axis of rotation that is parallel to the first axis of rotation and a second surface that lies on a parabola having a focus that coincides with one of the foci of the ellipse, and a mirror positioned to adjust an optical axis of a laser beam entering the telescope parallel to an optical axis of a laser beam exiting the telescope.

Implementations can include one or more of the following features. For example, The second axis of rotation can be collinear with the first axis of rotation. The telescope can be adapted for movement parallel to the optical axis of the laser beam that enters the telescope without altering an alignment of the laser beam entering the telescope. The ellipsoidal mirror and the paraboloidal mirror can be fixed in position relative to each other. A common carrier element can be included upon which the ellipsoidal mirror and the paraboloidal mirror are mounted in a fixed relationship to each other. The mirror positioned to adjust an optical axis of a laser beam entering the telescope is a planar mirror.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DESCRIPTION OF DRAWINGS

Like reference symbols in the various drawings indicate like elements.

DETAILED DESCRIPTION

In a telescope having an ellipsoidal mirror and a paraboloidal mirror and used to control a laser beam, the axes of rotation of the ellipsoidal mirror and the paraboloidal mirror can extend parallel to and collinearly with each other. For example, the focus of the paraboloidal mirror can coincide with a focus of the ellipsoidal mirror.

Figure 1:
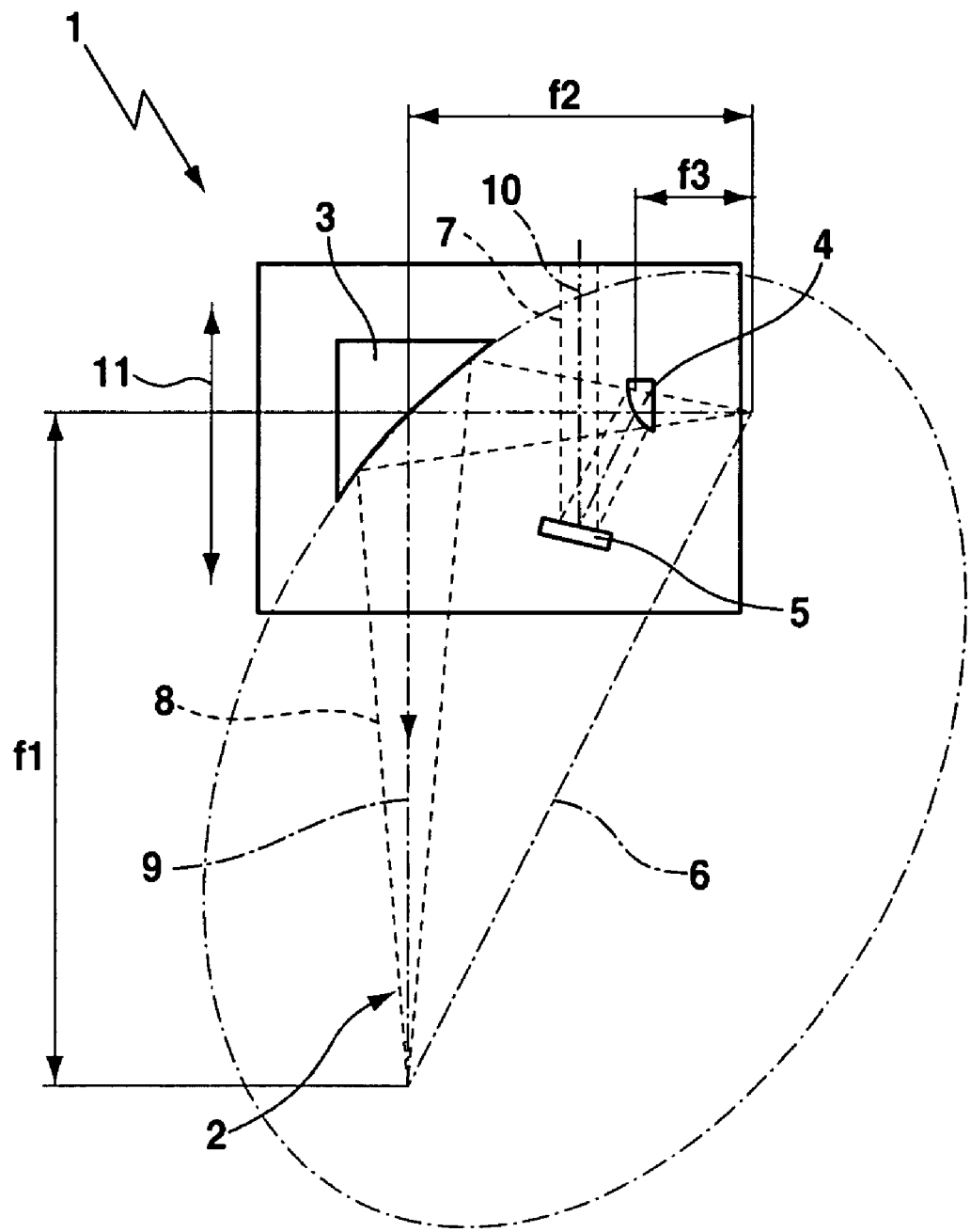
FIG. 1 is a schematic side view of a telescope with ellipsoidal, paraboloidal and additional mirrors.

As shown in FIG. 1, a telescope 1 is disposed in front of scanner mirrors of a laser processing machine and serves for widening a laser beam 2 of the laser processing machine and also for varying the focal position of the laser beam 2.

The telescope 1 includes a concave ellipsoidal mirror 3, a convex paraboloidal mirror 4, and a planar mirror 5. The ellipsoidal mirror 3 and the paraboloidal mirror 4 have a collinear axis of rotation 6 and are not adjustable relative to each other. The ellipsoidal mirror 3 has a surface that lies on an ellipse having two foci and is characterized by the two focal distances, $f_1$ and $f_2$, and the paraboloidal mirror 4 has a surface that lies on parabola that has one focus and is characterized by a focal distance, $f_3$. As shown in FIG. 1, the focus 13 of the paraboloidal mirror 4 coincides with a focus of the ellipsoidal mirror 3.

A laser beam 7 that enters the telescope 1 is reflected by the planar mirror 5 to the paraboloidal mirror 4 and from the parabolic mirror 4 to the ellipsoidal mirror 3, which deflects the laser beam 8 exiting the telescope 1, and its optical axis 9, parallel to the optical axis 10 of the incident laser beam 7 and in the direction of the incident laser beam 7. Subsequently, the telescope 1 can be moved without interposing further optical elements in the direction of the optical axis 9 or 10 (i.e. in the direction of the double arrow 11) whereby the focal position of the exiting laser beam 8 can be varied.

The optical axes of the laser beam 7 that enters the telescope 1 and of the laser beam 8 that exits the telescope 1 can extend parallel to each other, such that the telescope 1 can be moved parallel to the optical axis of the laser beam 7 entering the telescope 1 (i.e., either in the same or in the opposite direction of the incident laser beam 7) without altering the alignment of the laser beam 7 with the mirrors 3 and 4.

As shown in FIG. 1, the telescope 1 can include a planar mirror 5 that adjusts the optical axis of the laser beam 7 entering the telescope 7 parallel to the optical axis of the laser beam 8 that exits the telescope 1. Thus, the telescope 1 can be moved in the direction of the entering laser beam 7 or exiting laser beam 8 without requiring additional optics in the path of rays of the laser light.

Figure 2:
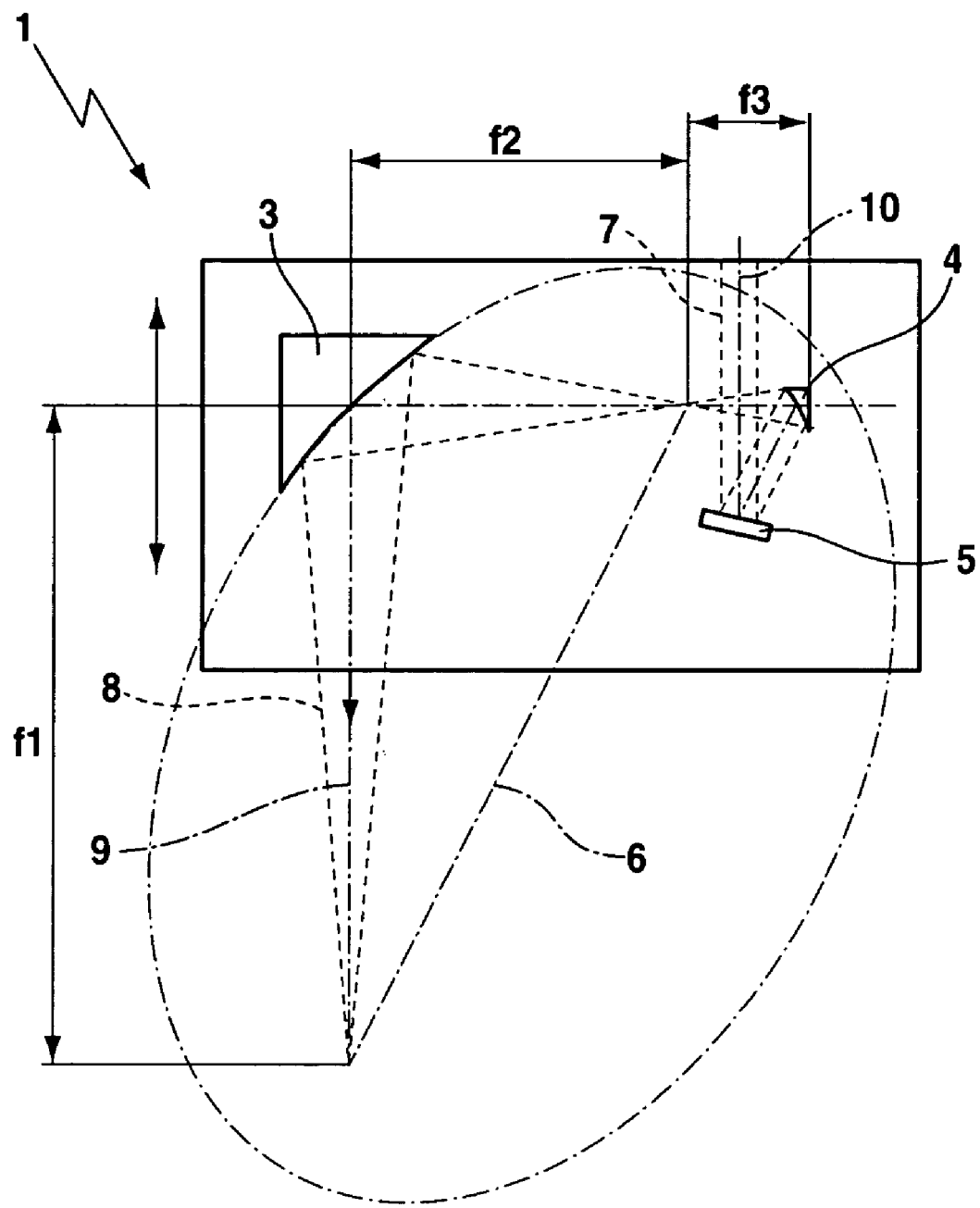
FIG. 2 is another schematic side view of a telescope with ellipsoidal, paraboloidal, and additional mirrors.

In contrast to the telescope shown in FIG. 1, the paraboloidal mirror 4 of the telescope 1 shown in FIG. 2 is concave and the planar mirror 5 has a different orientation to adjust the incident laser beam 7 and its optical axis 10 parallel to the optical axis 9 of the exiting laser beam 8.

Figure 3:
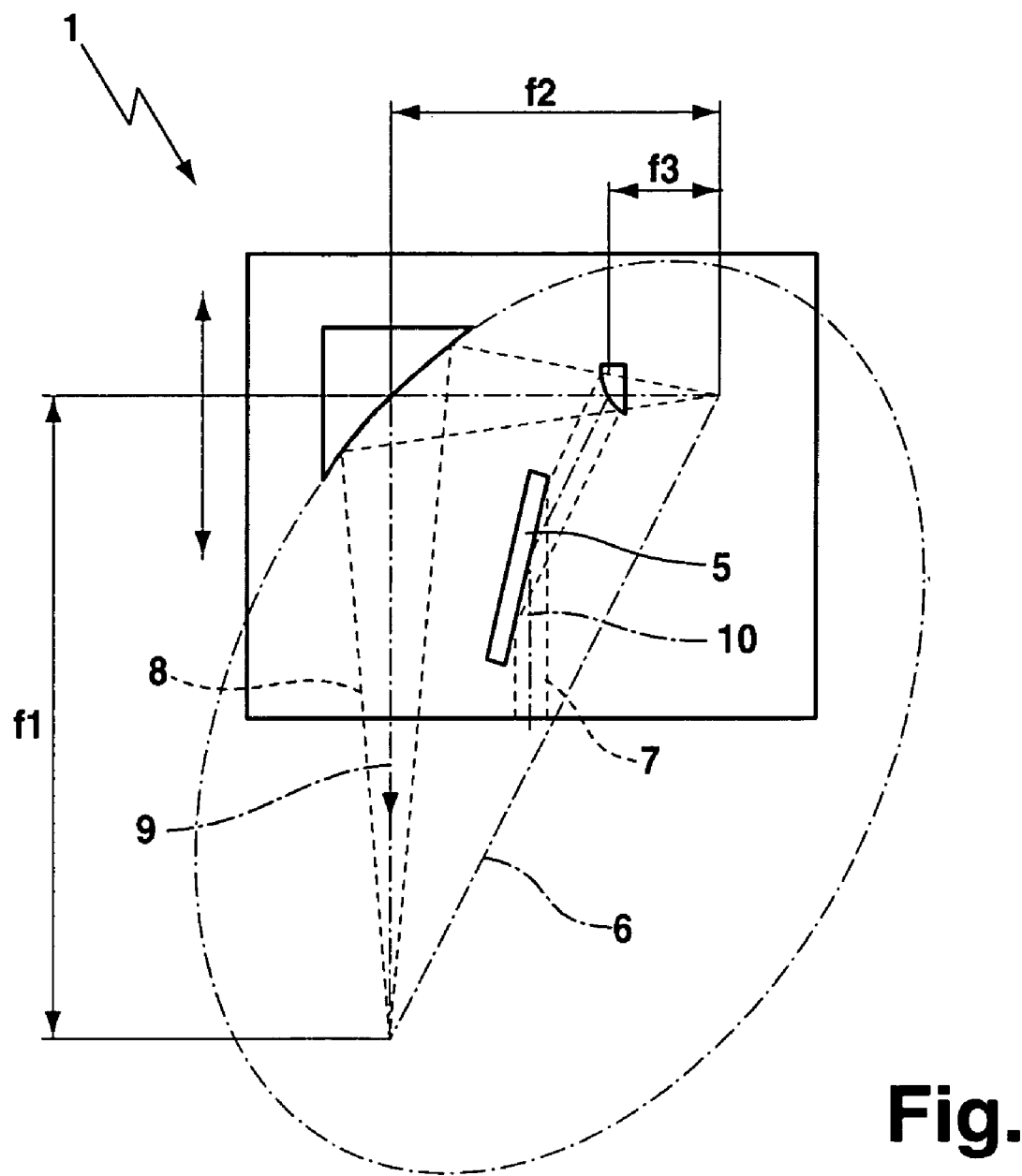
FIG. 3 is an additional schematic side view of a with ellipsoidal, paraboloidal, and additional mirrors.

The telescope 1 shown in FIG. 3 differs from the telescope 1 of FIG. 1 in that the planar mirror 5 adjusts the incident laser beam 7 and its optical axis 10 parallel to the optical axis 9 and opposite to the exiting laser beam 8.

Figure 4:
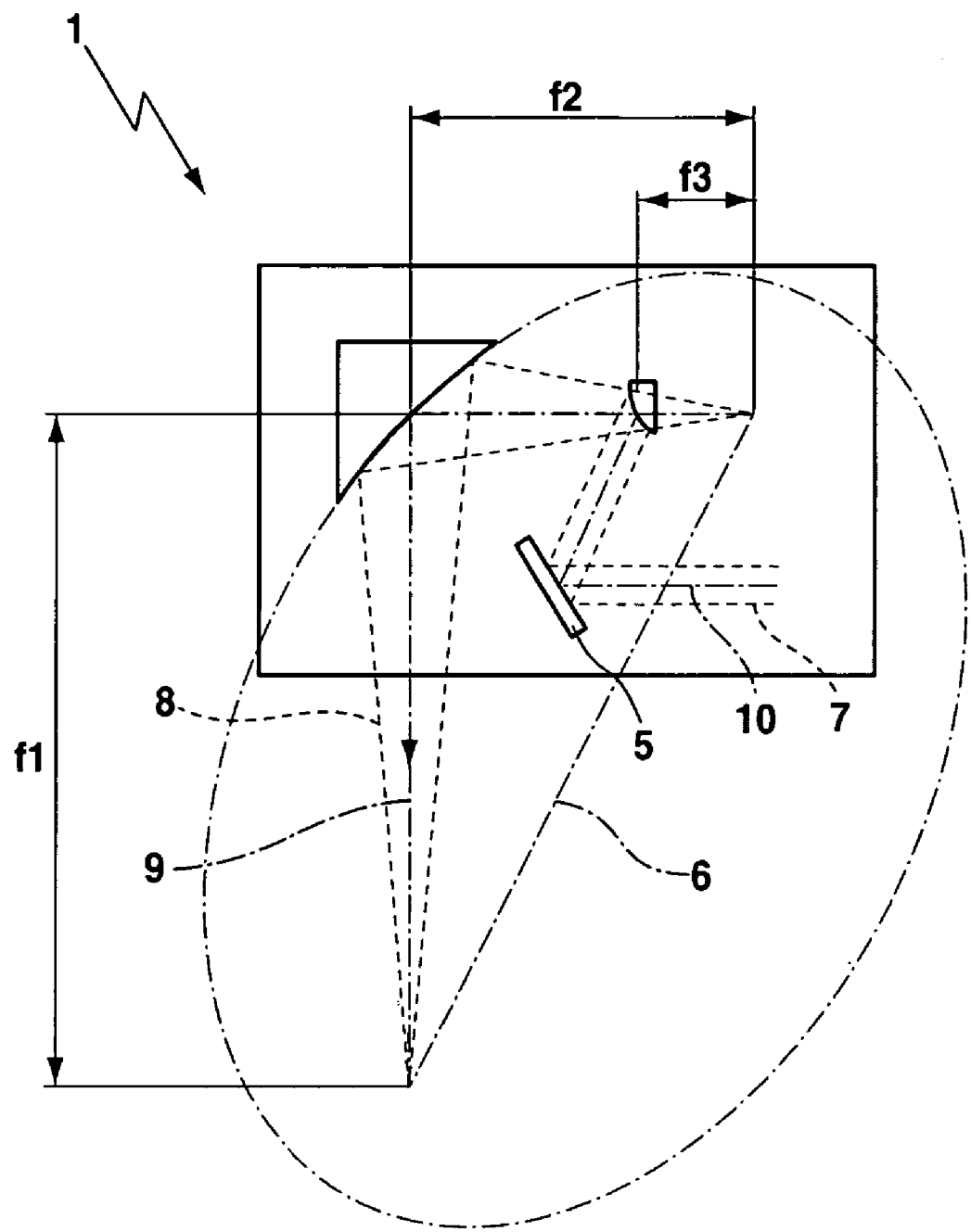
FIG. 4 is a further schematic side view of a telescope with ellipsoidal, paraboloidal, and additional mirrors.

The planar mirror 5 of the telescope 1 shown in FIG. 4 is disposed such that the optical axis 10 of the incident laser beam 7 is directed at a right angle to the optical axis 9 of the exiting laser beam 8.

Figure 5:
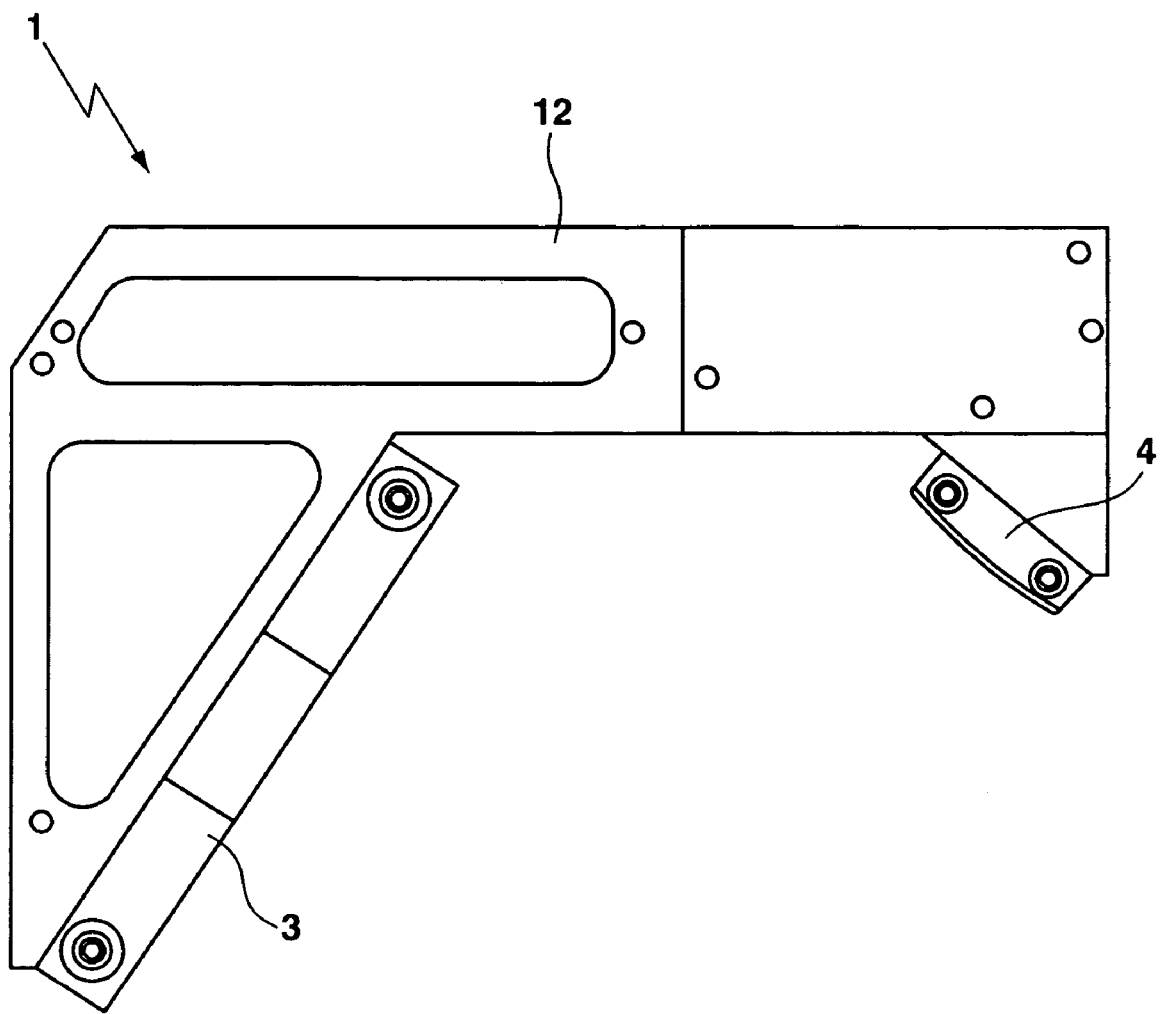
FIG. 5 is a schematic side view of a telescope with a common carrier element for the ellipsoidal and paraboloidal mirrors.

As is shown in FIG. 5, the ellipsoidal mirror 3 and the paraboloidal mirror 4 are fixed on a carrier element 12 such that they cannot be mutually adjusted, already before production of their reflecting surfaces through machining of their surfaces with a diamond lathe. The axis of rotation of the processing machine in which the carrier element 12 with the mirror blanks is clamped extends collinearly to the axis of rotation 6 (not shown in FIG. 5) of the ellipsoidal mirror 3 and the paraboloidal mirror 4 during production of the reflecting surfaces of the two mirrors 3 and 4. The additional mirror 5 can be separately mounted or also be mounted on the carrier element 12.

The parallel and, in particular, collinear orientation of the two mirrors allows production of the reflecting surfaces of the two mirrors in a single setting (e.g., through machining of the surfaces with a diamond lathe) using a processing machine whose axis of rotation extends collinearly with the axes of rotation of the two mirrors during production of the reflecting surfaces of the two mirrors. The surfaces of the mirrors 3 and 4 can be machined with such precision that later adjustment of the mirrors is not required. The ellipsoidal mirror 3 and the paraboloidal mirror 4 can be arranged such that they are not movable relative to each other (i.e., without any adjustment means). Prior to production of the reflecting surfaces of the two mirrors, the mirror blanks can be mounted to a common carrier element and remain fixed thereto on a permanent basis.

OTHER EMBODIMENTS

A number of embodiments of the invention have been described. Nevertheless, it will be understood that various modifications may be made. Accordingly, other embodiments are within the scope of the following claims.

The invention claimed is:

1. A laser processing machine for processing workpieces using a laser beam, the laser processing machine comprising:
   a telescope for widening and focusing a laser beam, the telescope comprising:
      an ellipsoidal mirror having a first axis of rotation and a first surface that lies on an ellipse having two foci; and
      a paraboloidal mirror having a second axis of rotation that is parallel to the first axis of rotation and a second surface that lies on a parabola having a focus that coincides with one of the foci of the ellipse; and
      a mirror positioned to adjust the optical axis of the laser beam within the telescope such that the optical axis of the laser beam exiting the telescope is parallel with the optical axis of the laser beam entering the telescope.

2. The laser processing machine of claim 1, wherein the second axis of rotation is collinear with the first axis of rotation.

3. The laser processing machine of claim 1, wherein the ellipsoidal mirror and the paraboloidal mirror are fixed in position relative to each other.

4. The laser processing machine according to claim 3, further comprising a common carrier element upon which the ellipsoidal mirror and the paraboloidal mirror are mounted in a fixed relationship to each other.

5. The laser processing machine of claim 1, wherein the mirror positioned to adjust an optical axis of a laser beam entering the telescope is a planar mirror.

6. The laser processing machine of claim 1, wherein the ellipsoidal mirror has a mirror surface shaped as an ellipsoidal segment.

7. The laser processing machine of claim 1, wherein the ellipsoidal mirror is concave.

8. The laser processing machine of claim 1, wherein the paraboloidal mirror is convex.

9. The laser processing machine of claim 1, wherein the paraboloidal mirror is concave.

10. The laser processing machine of claim 1, wherein the mirror is positioned to adjust the optical axis of the laser beam that impinges upon the mirror such that the optical axis of the laser beam impinging upon the mirror and the optical axis of the laser beam exiting the telescope are both parallel with the telescope axis.

11. A laser processing machine for processing workpieces using a laser beam, the laser processing machine comprising:
   a telescope for widening and focusing a laser beam, the telescope comprising:
      an ellipsoidal mirror having a first axis of rotation and a first surface that lies on an ellipse having two foci; and
      a paraboloidal mirror having a second axis of rotation that is parallel to the first axis of rotation and a second surface that lies on a parabola having a focus that coincides with one of the foci of the ellipse; and a mirror positioned to adjust an optical axis of a laser beam entering the telescope parallel to an optical axis of a laser beam exiting the telescope;

wherein the telescope is adapted for movement parallel to the optical axis of the laser beam that enters the telescope without altering an alignment of the laser beam entering the telescope.

12. The laser processing machine of claim 11, wherein the second axis of rotation is collinear with the first axis of rotation.

13. The laser processing machine of claim 11, wherein the ellipsoidal mirror and the paraboloidal mirror are fixed in position relative to each other.

14. The laser processing machine of claim 11, wherein the mirror positioned to adjust an optical axis of a laser beam entering the telescope is a planar mirror.

15. The laser processing machine of claim 11, wherein the ellipsoidal mirror has a mirror surface shaped as an ellipsoidal segment.

16. A telescope for widening and focusing a laser beam, the telescope comprising:

an ellipsoidal mirror having a first axis of rotation and a first surface that lies on an ellipse having two foci;

a paraboloidal mirror having a second axis of rotation that is parallel to the first axis of rotation and a second surface that lies on a parabola having a focus that coincides with one of the foci of the ellipse; and a mirror positioned to adjust the optical axis of the laser beam within the telescope such that the optical axis of the laser beam exiting the telescope is parallel with the optical axis of the laser beam entering the telescope.

17. A telescope of claim 16, wherein the second axis of rotation is collinear with the first axis of rotation.

18. A telescope of claim 16, wherein the ellipsoidal mirror and the paraboloidal mirror are fixed in position relative to each other.

19. A telescope of claim 18, further comprising a common carrier element upon which the ellipsoidal mirror and the paraboloidal mirror are mounted in a fixed relationship to each other.

20. A telescope of claim 16, wherein the mirror positioned to adjust an optical axis of a laser beam entering the telescope is a planar mirror.

21. A telescope of claim 16, wherein the ellipsoidal mirror has a mirror surface shaped as an ellipsoidal segment.

22. A telescope of claim 16, wherein the ellipsoidal mirror is concave.

23. A telescope of claim 16, wherein the paraboloidal miffor is convex.

24. A telescope of claim 16, wherein the paraboloidal minor is concave.

25. The telescope of claim 16, wherein the mirror is positioned to adjust the optical axis of the laser beam that impinges upon the mirror such that the optical axis of the laser beam impinging upon the mirror and the optical axis of the laser beam exiting the telescope are both parallel with the telescope axis.

26. A telescope for widening and focusing a laser beam, the telescope comprising:

an ellipsoidal mirror having a first axis of rotation and a first surface that lies on an ellipse having two foci;

a paraboloidal mirror having a second axis of rotation that is parallel to the first axis of rotation and a second surface that lies on a parabola having a focus that coincides with one of the foci of the ellipse; and a mirror positioned to adjust an optical axis of a laser beam entering the telescope parallel to an optical axis of a laser beam exiting the telescope, wherein the telescope is adapted for movement parallel to the optical axis of the laser beam that enters the telescope without altering an alignment of the laser beam entering the telescope.

27. The telescope of claim 26, wherein the second axis of rotation is collinear with the first axis of rotation.

28. The telescope of claim 26, wherein the ellipsoidal mirror and the paraboloidal mirror are fixed in position relative to each other.

29. The telescope of claim 26, wherein the mirror positioned to adjust an optical axis of a laser beam entering the telescope is a planar mirror.

30. The telescope of claim 26, wherein the ellipsoidal mirror has a mirror surface shaped as an ellipsoidal segment.

* * * * *

UNITED STATES PATENT AND TRADEMARK OFFICE
CERTIFICATE OF CORRECTION

PATENT NO. : 7,297,898 B2 Page 1 of 1
APPLICATION NO. : 10/520525
DATED : November 20, 2007
INVENTOR(S) : Thomas Zeller and Joachim Schulz It is certified that error appears in the above-identified patent and that said Letters Patent is hereby corrected as shown below:

Title Page, Item (30) Foreign Application Priority Data should read as follows:

--Jul. 10, 2002 (DE) ………………..... 10230960--

Signed and Sealed this

Fifteenth Day of April, 2008

JON W. DUDAS
*Director of the United States Patent and Trademark Office*